United States Patent [19]

Mosher et al.

[11] Patent Number: 5,456,142

[45] Date of Patent: Oct. 10, 1995

[54] METHOD AND APPARATUS FOR OPENING VEHICLE HOOD

[76] Inventors: Raymond M. Mosher, 2908 30th Pl., Farmington, N.M. 87402; Randal A. Wakeland, P.O. Box 1821, Kirtland, N.M. 87417

[21] Appl. No.: 282,414

[22] Filed: Jul. 28, 1994

Related U.S. Application Data

[63] Continuation of Ser. No. 908,178, Jul. 2, 1993, abandoned.

[51] Int. Cl.⁶ .................................................. B25B 33/00
[52] U.S. Cl. ............................................. 81/15.9; 81/488
[58] Field of Search ................................ 24/71.1, 71.2, 24/71.3; 81/15.9, 488

[56] References Cited

U.S. PATENT DOCUMENTS

| | | |
|---|---|---|
| 54,119 | 8/1866 | Crawford . |
| 73,034 | 1/1868 | Phillips . |
| 197,888 | 12/1877 | Pene . |
| 374,668 | 12/1887 | Fylnn et al. . |
| 470,106 | 3/1892 | Delbridge . |
| 529,648 | 11/1894 | Green . |
| 587,228 | 7/1897 | Orton . |
| 616,176 | 12/1898 | Zimmerman . |
| 756,389 | 4/1904 | Montgomery . |
| 758,829 | 5/1904 | Dodd . |
| 839,311 | 12/1906 | Nepean-Hutchison . |
| 923,586 | 6/1909 | Schermerhorn . |
| 930,533 | 8/1909 | Cokley . |
| 938,563 | 11/1909 | Ferguson . |
| 1,044,551 | 11/1912 | Lynch . |
| 1,082,742 | 12/1913 | Fossum . |
| 1,092,700 | 4/1914 | Doze . |
| 1,244,836 | 10/1917 | Corsepins . |
| 1,581,164 | 4/1926 | Boynton . |
| 1,582,889 | 5/1926 | Abbiuso .................................. 81/177.6 |
| 1,663,182 | 3/1928 | Semmler . |
| 1,715,902 | 6/1929 | Countryman .......................... 81/177.6 |
| 1,975,110 | 10/1934 | Louckers .................................. 24/71.2 |
| 2,152,090 | 3/1939 | Pryne . |
| 2,188,937 | 2/1940 | Bertram . |
| 2,456,895 | 12/1948 | Sattler . |
| 2,483,193 | 9/1949 | Glaskin . |
| 2,567,270 | 9/1951 | Belich . |
| 2,679,082 | 5/1954 | Himberger .............................. 24/71.3 |
| 3,062,502 | 11/1962 | Pelletier . |
| 3,319,306 | 5/1967 | Von Tersch et al. . |
| 3,664,211 | 5/1972 | McConnell ............................. 81/15.9 |
| 3,874,638 | 4/1975 | Langlie et al. . |
| 4,622,868 | 11/1986 | Flannigan ............................... 81/15.9 |
| 4,800,628 | 1/1989 | Farnsworth ............................. 24/71.3 |

FOREIGN PATENT DOCUMENTS

| | | |
|---|---|---|
| 111004 | 1/1876 | France . |
| 351655 | 5/1905 | France . |
| 1308462 | 5/1987 | U.S.S.R. .................................. 81/488 |

OTHER PUBLICATIONS

"The Quick Hook", WNYF (With New York Firefighters) Magazine, p. 23, vol. 52, No. 2, 1991.

*Primary Examiner*—James G. Smith
*Attorney, Agent, or Firm*—Kenton L. Freudenberg; Mawxell C. Freudenberg

[57] ABSTRACT

A method and apparatus for opening the hood of a vehicle wherein the normal hood latch release mechanism is inaccessible or has been rendered inoperable by fire damage to a release cable, by providing an narrow opening at an unanchored portion of the vehicle hood by lifting the hood portion slightly away from the vehicle body to create a slight opening into the engine compartment at a point where the release cable can be reached by a tool and without permanently deforming the hood; providing a cable manipulating tool with an elongated body portion capable of being inserted through the narrow opening, the tool end being provided with a structure for grasping and holding the hood release cable and applying a tensive or other force to the cable to effect release of the hood latch; and using the apparatus by inserting the tool through said narrow opening, engaging the hood release cable and manipulating the tool to apply a tensive force to said cable to effect release of the hood latch; and manually opening the hood.

23 Claims, 9 Drawing Sheets

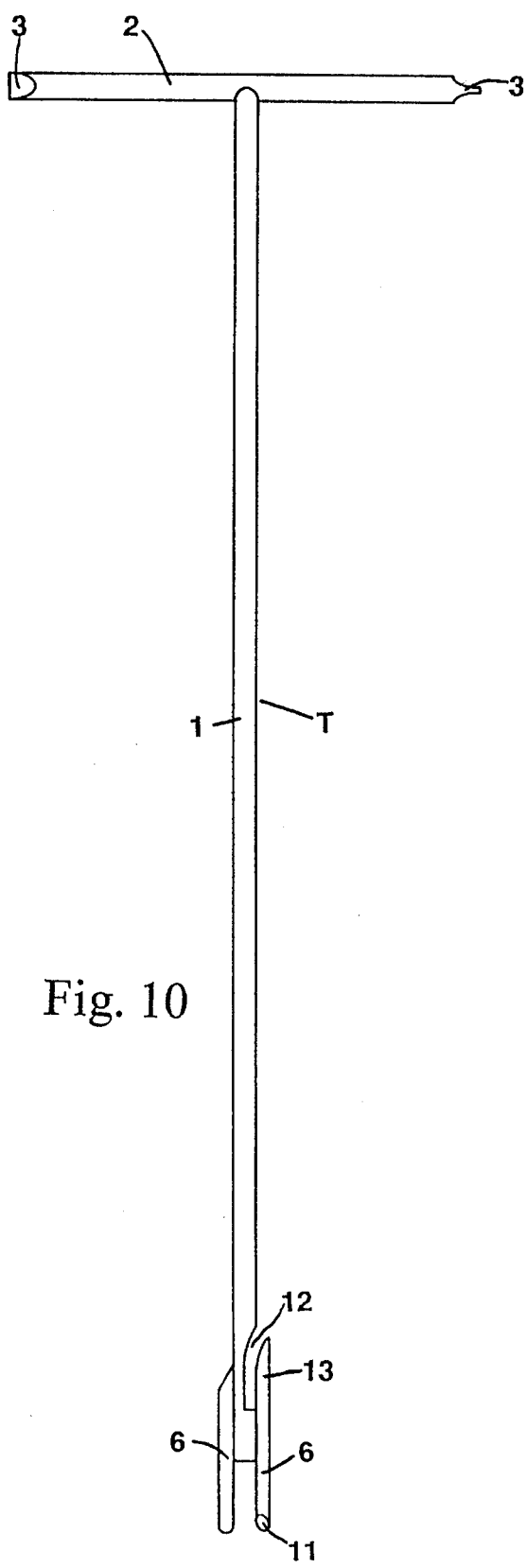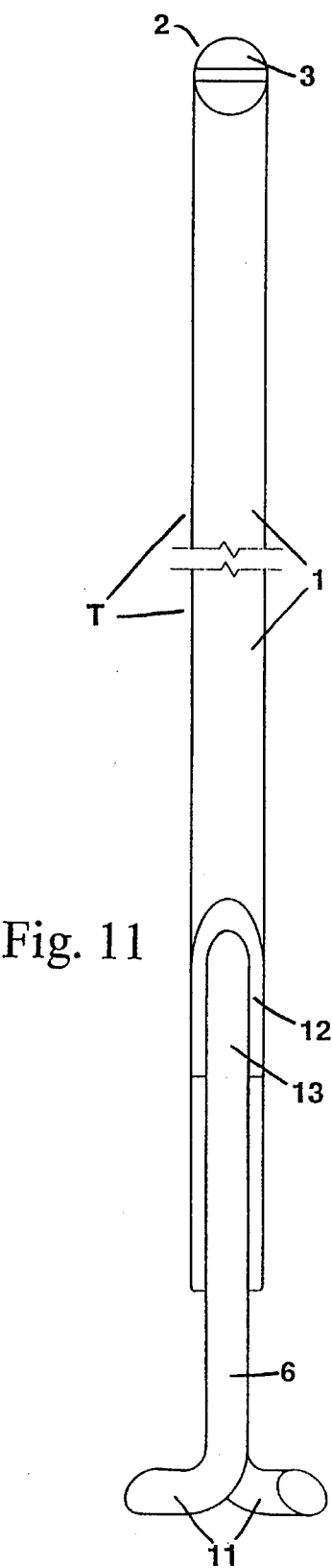

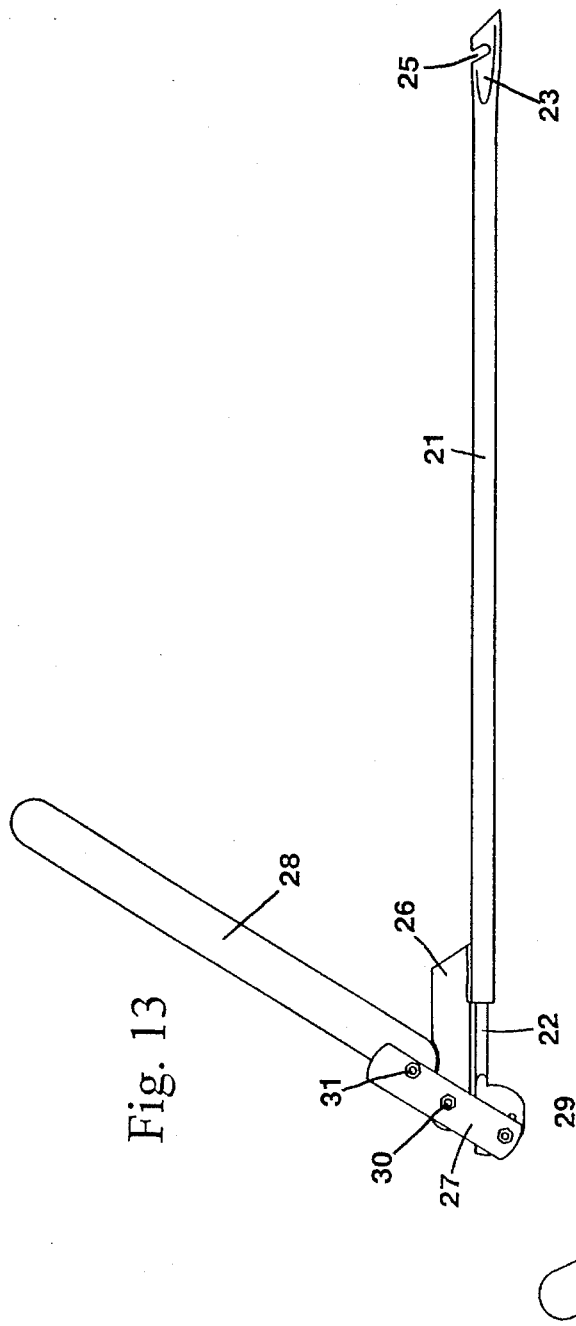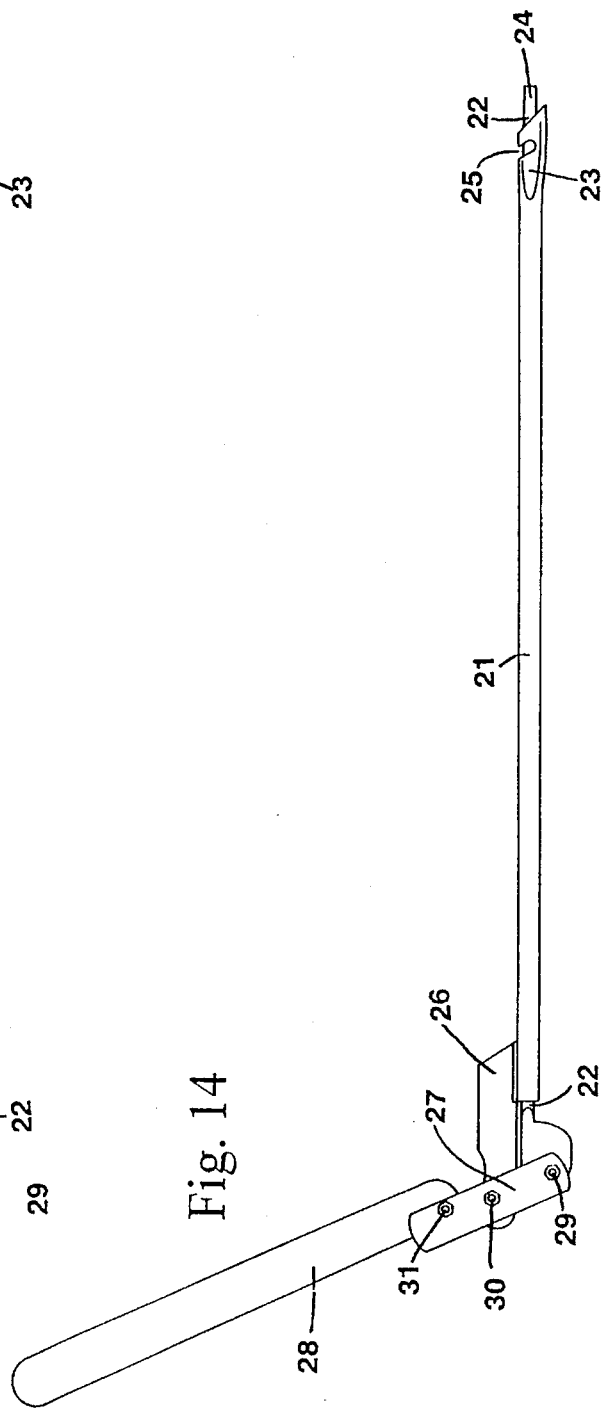

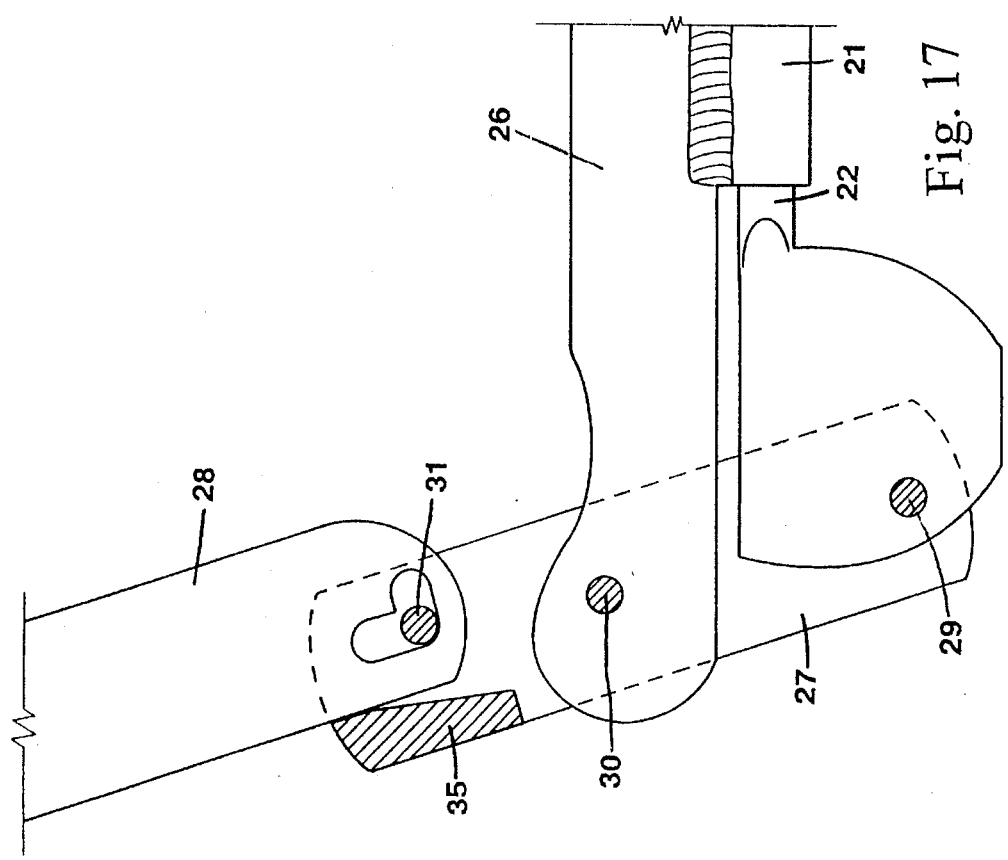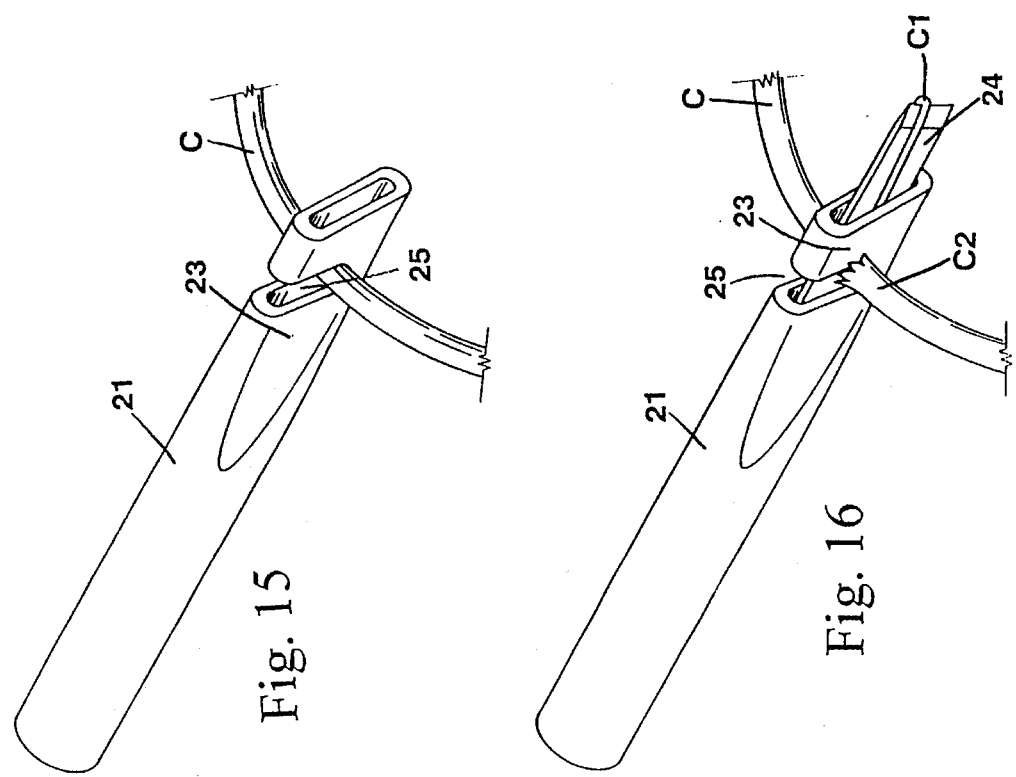

METHOD AND APPARATUS FOR OPENING VEHICLE HOOD

This application is a con of Ser. No. 07/908,178, filed Jul. 2, 1992, abandoned.

BACKGROUND OF THE INVENTION

Firefighters are often faced with the problem of extinguishing a fire within an enclosed engine compartment of an automobile or other vehicle. To accomplish this task and to insure that such a fire has been completely put out it is highly desirable to be able to open the vehicle hood, which, in many vehicles, requires manually operating a cabled hood release handle which is generally accessible from the driver's position. However, this manual hood release is typically remotely connected to a latch on the vehicle hood by a metal cable which passes through, slides within, and is retained by a hollow plastic or spiralled wire sleeve or sheath which is coaxial with the cable. This cable and sleeve assembly operates on the principle of a "boden wire" to allow manual release of the hood latch by tension applied by the release handle through the cable. The heat of a fire within the engine compartment of the vehicle will commonly damage a plastic sleeve or cable housing so that the metal cable is no longer sufficiently retained to allow transmission of a force to the hood latch. In more extreme cases the cable itself may be weakened or completely severed. Under such conditions, even if the manually operable handle portion of the hood release mechanism is accessible in the vehicle's passenger compartment, the hood latch itself may not be remotely releasable by means of this interior hood release. Such a situation has previously required that the vehicle hood be cut or forced open, generally resulting in substantial damage to the body of the vehicle. It has previously not been unusual for the degree or amount of such damage to be greater than that caused by the fire itself, particularly in a situation where an engine compartment fire is small or is extinguished before it causes significant damage. Access to the hood release handle to gain entry to an engine compartment may be hampered because the vehicle doors are locked and may also be hampered by a fire in the passenger compartment which may prevent access to the interior hood release handle or which may damage the handle sufficiently to render it inoperable.

SUMMARY OF THE INVENTION

The present invention provides a method and tool for grasping a hood release cable and sleeve assembly, whether damaged or not, at a point within the engine compartment and applying a sufficient tension force to the cable to release the hood latch. Each of the tools of this invention firmly secures the cable to grasping means of the tool by initial manipulation of the tool to clench or ensnarl the cable in the grasping means whereupon further manipulation of the tool will be such as to apply the tension force to the cable to release the hood latch. By using the tools and technique of the present invention, access to the engine compartment can generally be accomplished without having to cause unnecessary damage to the hood or body of the vehicle. While it has been previously known to use a simple hook-type pulling tool to quickly engage and transversely pull the release cable of a hood latch assembly within the engine compartment, the usefulness of such a tool is limited to situations in which the metal cable is intact and anchored at each end but otherwise is manually inoperable, such as a situation when the passenger compartment is locked or involving a passenger compartment fire as described above.

Generally while a vehicle hood is latched securely in place to prevent its opening inadvertently while the vehicle is moving, the latch is typically located at a single point. A vehicle hood may be viewed as being generally rectangular in shape and oriented in relation to the vehicle so that there are four edges, namely a front edge, a rear edge and two side edges. The latching point of the hood is most commonly found in the center of the front edge, but is also found in the center of the rear edge. Usually two hood hinges are located at the edge opposite the latch point and spaced apart from one another. When a hood is closed and latched in place, the corners of the hood located at either end of the edge where the latch is positioned are typically not anchored down. Because the hood itself has some degree of torsional flexibility, these unanchored corners can usually be lifted or pried away from the vehicle body a small distance without causing any permanent deformation of, or damage to, the hood.

The hood release cable of a vehicle with a forward hood latch typically passes through the vehicle firewall, which separates the passenger compartment from the engine compartment, then along the driver's side of the engine compartment to a forward corner of the engine compartment where the path of the cable turns at approximately a right angle and passes along the front of the engine compartment to the hood latch located at the front center of the engine compartment. The point at the forward corner of the engine compartment where the cable path turns is located generally below or very close to an unanchored corner of the hood as described above.

The tool of the present invention comprises a thin and rigid elongated shaft which can be inserted far into the engine compartment of a vehicle through a relatively small opening. At one end of the shaft is a cable grasping and winding portion which is a tensioning means used for engaging and winding a portion of the hood release cable to take up any slack in the cable by twisting the shaft so that upon further winding or simply pushing or pulling strongly on the shaft sufficient tension is applied to the cable to release the hood latch as it would normally be operated to release the hood. At the opposite end of the shaft is a handle portion which is generally perpendicular to the shaft to facilitate pulling or pushing the shaft axially or to provide leverage for twisting for a winding operation.

Because firefighters must have available and be familiar with the operation of a variety of equipment to handle the many emergency situations to which they must respond, it is desirable that any such equipment be simple to use and be relatively compact so as to require a minimum of storage space in a firefighting vehicle.

It is an object of the present invention to provide a method of releasing the hood latch of a vehicle when the normally manually operable cable release mechanism therefor is inaccessible or has been severed or damaged and rendered inoperative.

It is an object of the present invention to provide a simple universal tool for releasing the hood latch of a vehicle when the normally manually operable release mechanism has been damaged and rendered inoperative.

It is an object of the present invention to provide a simple tool which provides numerous functions related to releasing the hood latch of a vehicle when the normally manually operable release mechanism has been damaged and rendered inoperative.

It is another object of the present invention to provide a means of forcing access to the engine compartment of a vehicle without causing any significant damage to the body of the vehicle.

DESCRIPTION OF THE DRAWINGS

FIGS. 10 and 11 are plan views of the device of the preferred embodiment oriented at ninety degrees with respect to one another. FIG. 10 is a complete view, whereas FIG. 11 has a central portion cut away to enable the end portions to be shown enlarged.

FIG. 13 is a plan view of the alternative embodiment of FIG. 12 showing the device with the manually operated lever extension unfolded or extended, but in an un-activated position.

FIG. 14 is a plan view of the alternative embodiment similar to FIG. 13, but showing the operating lever of the device in an activated position.

FIG. 15 is a perspective view of the cable engaging tip of the alternative embodiment corresponding to FIG. 13 and showing the device tip with a cable in a slot thereof before activation of the operating lever.

FIG. 16 is a perspective view of the cable engaging tip of the alternative embodiment corresponding to FIG. 14 showing the effect on the cable with the device in an activated position.

FIG. 17 is a plan view showing interconnecting details of the manually operable lever, its handle or lever extension portion and other parts of the alternative embodiment corresponding to their positions in FIG. 14 showing the device in an operating or activated position.

DESCRIPTION OF THE PREFERRED EMBODIMENT

Figure 3:
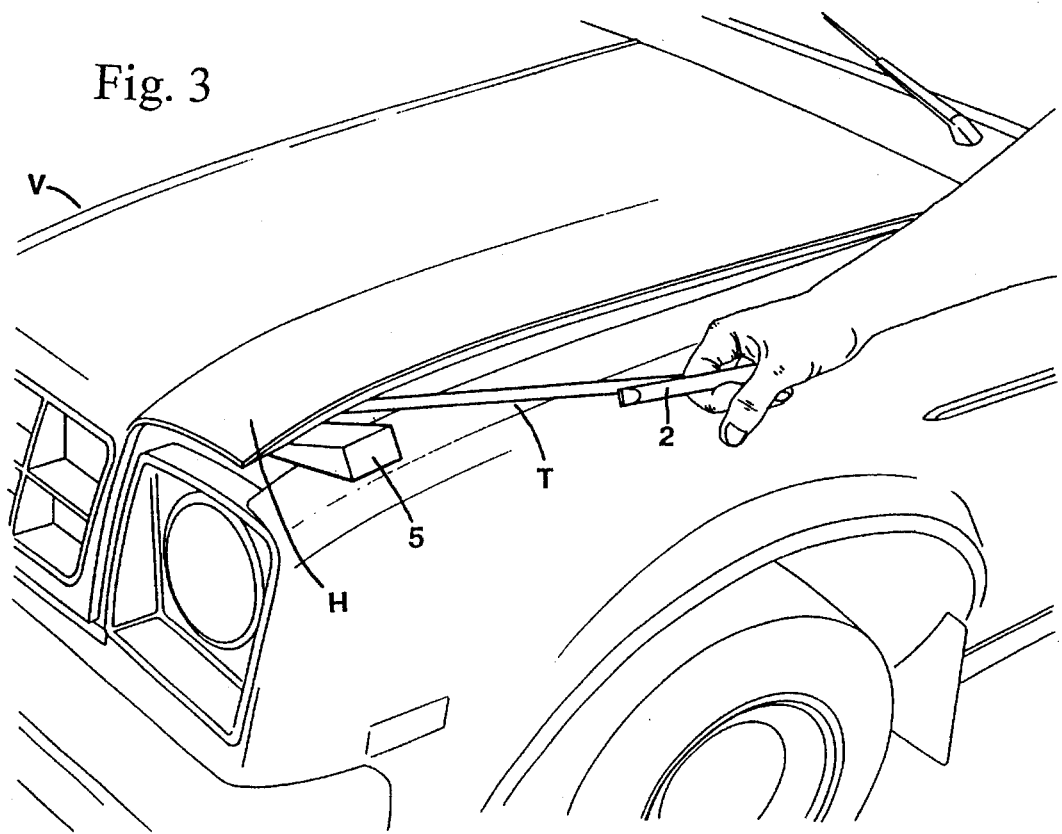
FIG. 3 is a perspective view corresponding to the illustration of FIG. 1 but from the opposite side of the vehicle and showing the exterior of the engine compartment with the hood wedged open as the tool device of the preferred embodiment is used to engage the hood release cable assembly as in FIG. 1.
Figure 8:
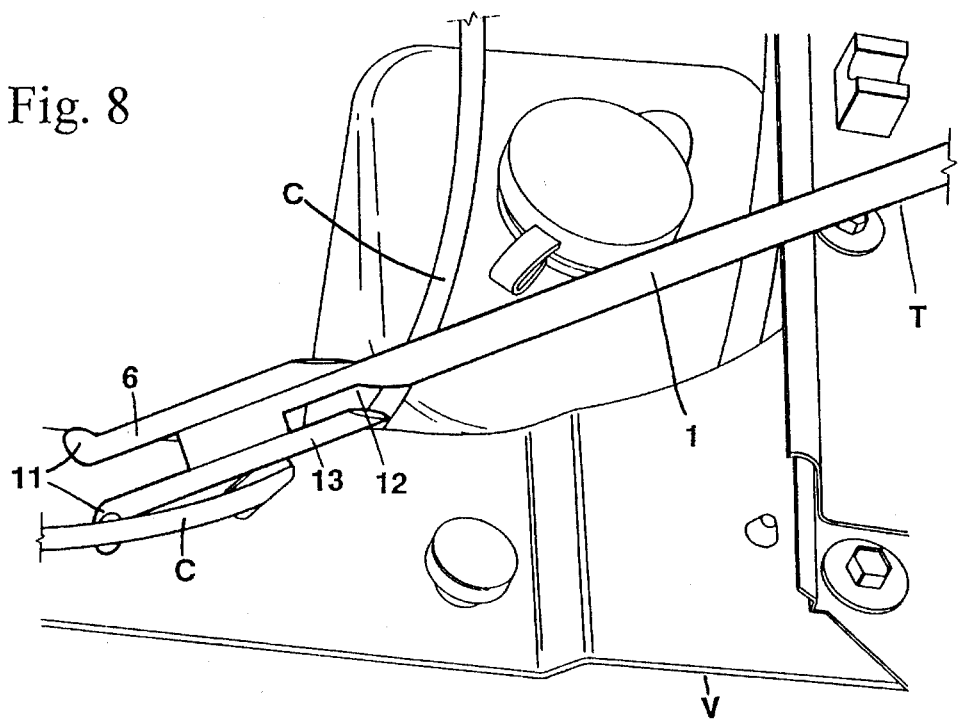
FIG. 8 is a frontal perspective view within the engine compartment of a vehicle showing detail of the angled tips of the bifurcated primary portion of the cable engaging end of the elongated tool device of the preferred embodiment as used to facilitate the engagement of the tool with a hood release cable assembly portion lying against a flat surface which extends generally parallel to the axis of the tool device.
Figure 9:
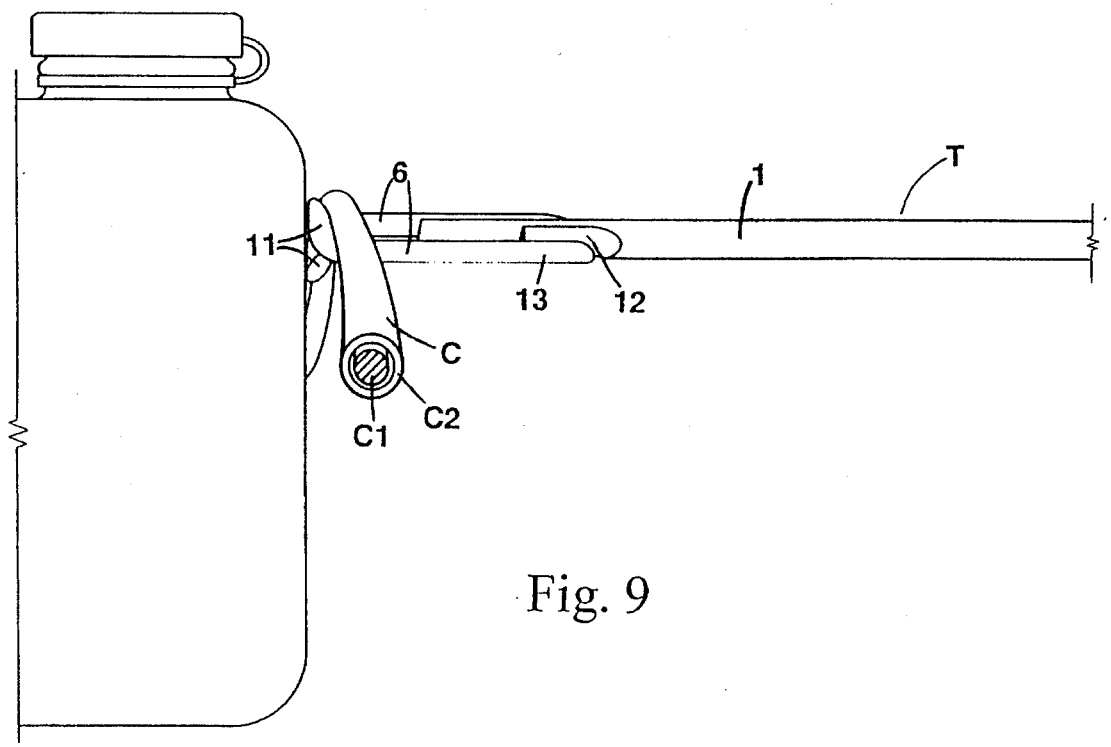
FIG. 9 is a perspective view within the engine compartment of a vehicle showing detail of the angled tips of the primary portion of the cable engaging end of the device of the preferred embodiment as used to facilitate the engagement of the tool with a hood release cable assembly portion lying against a flat surface which extends generally transversely or perpendicularly relative to the axis of the tool device.
Figure 12:
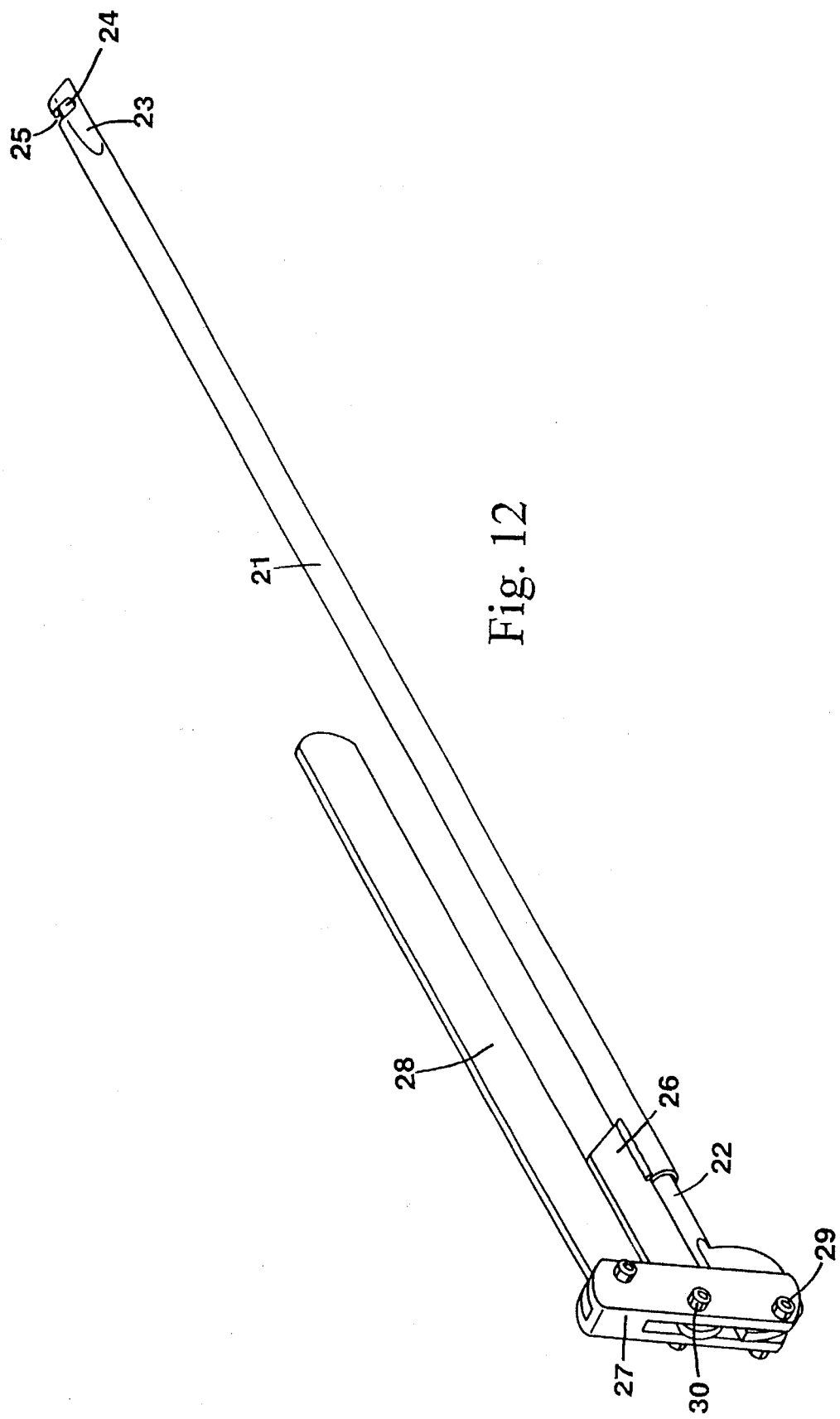
FIG. 12 is a perspective view of an alternative embodiment of a tool device for engaging the hood release cable assembly of a typical vehicle showing the device with a manually operated lever extension folded in its closed configuration for storage.

The device of the preferred embodiment is an elongated tool T constructed of steel or other suitable sturdy alloy. The primary tool body or shaft 1 is a cylindrical bar approximately 30 in. long and ½ in. in diameter. The axis of the primary shaft defines the primary axis of the tool. A handle portion 2 having a length of approximately 8 inches, and oriented perpendicular to the main shaft, is attached near its center to one end of the shaft. Each end of the handle portion is tapered to form a blade 3 similar to that of a heavy flat bladed screwdriver with the blades of the respective ends oriented at approximately right angles to one another. These tapered handle ends 3 are capable of being used to wedge under the edge of a closed vehicle hood to pry the hood slightly away from the vehicle body to create a sufficient space for insertion of the device into the engine compartment. Once opened this space can be maintained by insertion of a non-marring wooden or plastic wedge 5 as shown in FIG. 3 to facilitate entry of the tool. At the opposite end of the main shaft the device is provided with multiple distinct means for engaging the hood release cable assembly C of a vehicle in a variety of ways. A primary cable engaging means comprises a bifurcated structure formed by a pair of generally parallel forward extensions 6 located parallel to and on diametrically opposite sides of the end of the main shaft extending forwardly therebeyond and being spaced from one another sufficiently to allow the hood release cable assembly C to be straddled, with one such extension on each side of the cable. The forward end of each extension is angled to create an "L" shape with a projection 11 at approximately a right angle to its respective extension and also at a right angle to the plane defined by the main lees of the two extensions. These respective "L' shapes are oppositely oriented with the projections pointing in opposite directions. The projection on 11 each such extension terminates in a tapered tip which is provided with a planar beveled surface oriented at angle of approximately 45 degrees with respect to each of the legs of the "L" shaped extension. This angled tapered tip facilitates the initial engagement of the tool with a hood release cable assembly C when the tool is used in varying orientations to engage a cable lying flat against a planar surface such as is shown in FIG. 8 where the primary axis of the tool is generally parallel to the plane of the surface or in FIG. 9 where the tool is generally perpendicular to the flat surface. The free ends or tips of the minor legs or projections 11 of the L-shaped extensions extend in opposite directions and form abutment means in the form of surface portions extending outwardly transversely relative to the main legs of the extensions 6 to engage surface portions of cable wrapped on the extensions to aid in retaining the cable on the extensions during twisting of the tool body and prevent the wrapped cable from slipping lengthwise of the tool on the extensions. The beveled tips facilitate sliding them under a cable located against a flat surface as in FIG. 9 and facilitate sliding either of the tips under a cable located as in FIG. 8. A secondary cable engaging means comprises a generally hook shaped structure having a narrow elongated crook defined by an axially elongated recess 12 in the primary shaft and a rearwardly extending end portion 13 of one of the L-shaped extensions. The rearward extension 13 is located parallel to and spaced from the recessed portion of the main shaft sufficiently to allow the hood release cable assembly to be straddled therebetween. The tip of the rearward extension is tapered or beveled on the side toward the recess to facilitate engagement of a hood release cable assembly.

Figure 1:
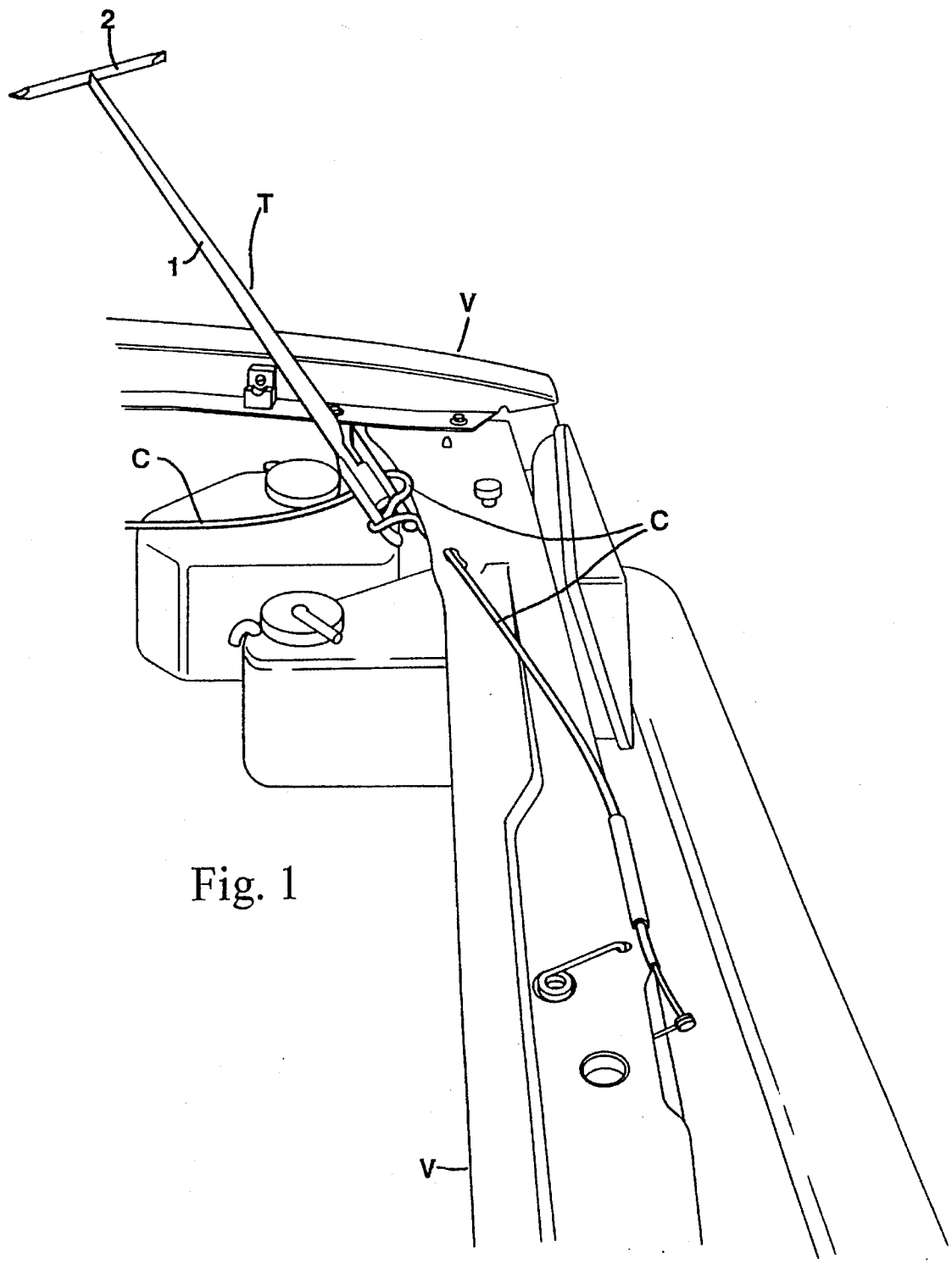
FIG. 1 is a perspective view of an elongated tool device of the preferred embodiment in use engaging the hood release cable assembly of a typical automotive engine compartment showing the interior of the engine compartment without the hood in place.
Figure 2:
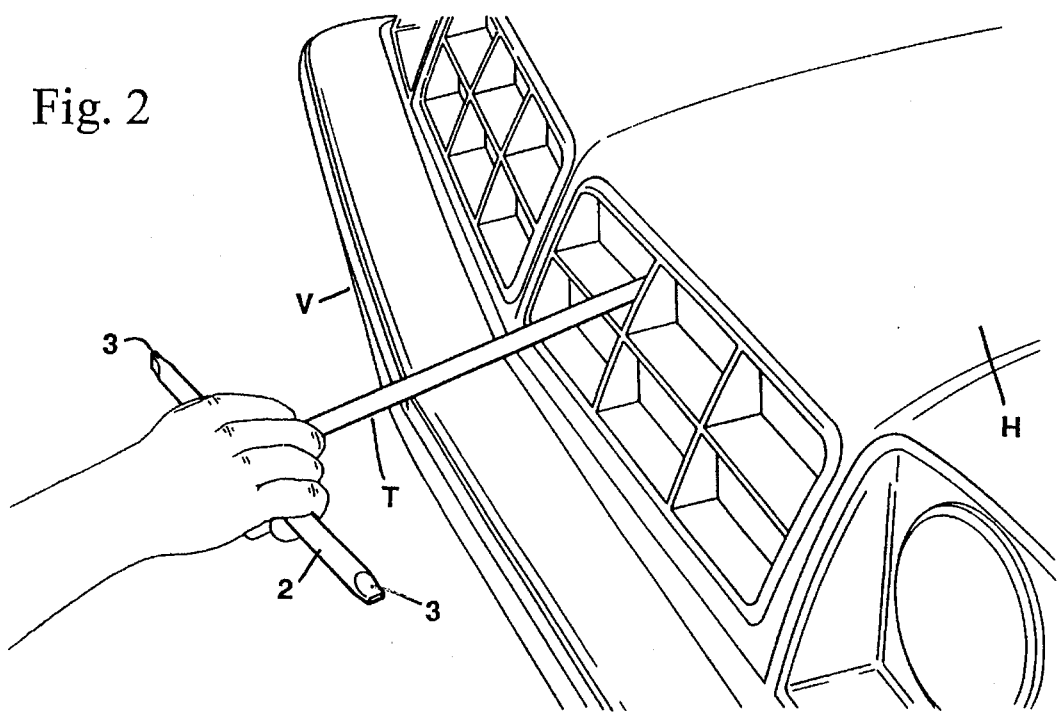
FIG. 2 is a perspective view of the device of the preferred embodiment in use showing its use by insertion through the grille of a typical automobile.
Figure 5:
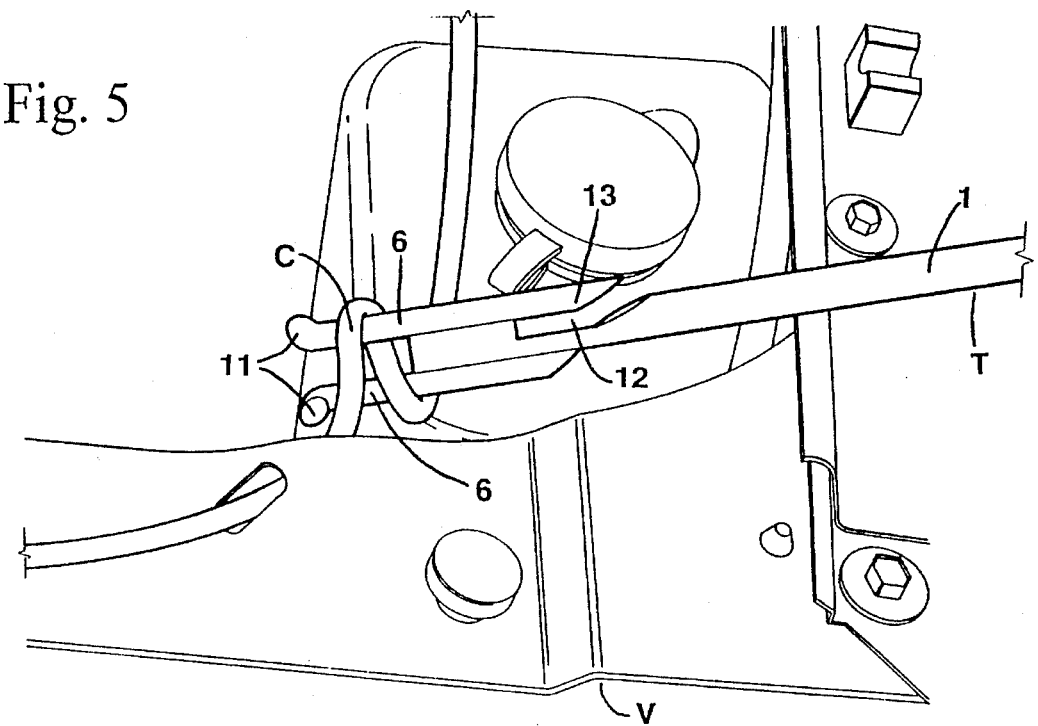
FIG. 5 is a frontal perspective view corresponding to FIG. 4 showing the hood release cable assembly in complete engagement with device of the preferred embodiment.
Figure 7:
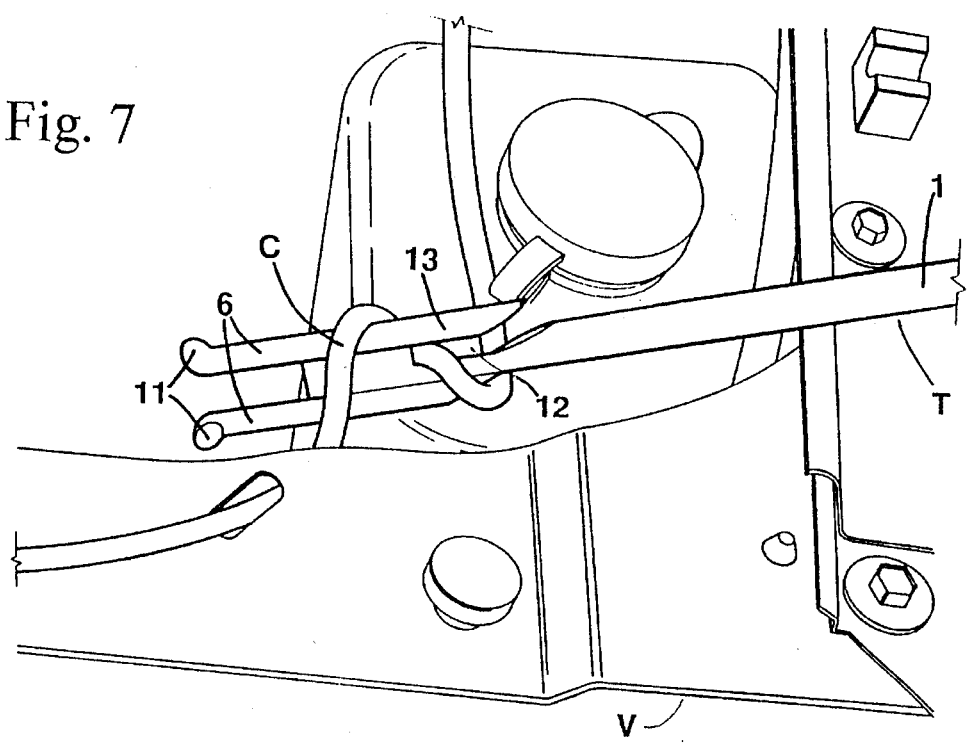
FIG. 7 is a frontal perspective view corresponding to FIG. 6 showing the hood release cable assembly in complete engagement with the hook portion of the tool device of the preferred embodiment.

Using either the primary or secondary cable engagement portion of the tool of the preferred embodiment, the cable is straddled by respective portions of the device. By rotating the device about the axis of its primary shaft the cable is wound as shown in FIGS. 1, 5 and 7 and is thus securely engaged. Tensive force may be applied to the cable by either continuing the winding action or by merely pulling on the tool generally along the primary axis in a direction toward the handle of the device.

An alternative embodiment of the tool of the present invention is shown in FIGS. 12 through 17 and provides a means of grasping a severed cable without requiring the cable to be wound upon the device.

The device is provided with an elongated hollow cylindrical or tubular primary tool body or shaft 21 within which a solid cylindrical secondary shaft 22 is axially movable and generally concentric with the primary shaft. At one end of the primary and secondary shafts, the cross section of each of the shafts is generally flattened, with each such flattened portion 23 and 24 respectively, remaining respectively hollow or solid. Within this flattened portion 23 of the primary shaft, a notch 25 is provided with a sufficient width to accept the cable assembly C of a hood release mechanism as shown in FIG. 15. At the opposite end of the primary shaft an operating lever assembly L having a short lever 27 with a manually operable handle or lever extension portion 28 is pivotably mounted with a fulcrum point near the center of the short lever at pivot 30. Pivot 30 is mounted on extension block 26 which is fixed in relation to the primary shaft. The short lever 27 has one of its ends attached to the secondary shaft 22 at another pivot point 29. The other end of the short lever has attached thereto an operating lever extension handle lever 28. Counterclockwise movement of the lever assembly about its fulcrum 30, by operation of the handle portion formed by handle lever 28 in one direction relative to the tool body from the position of FIG. 13 to the position of FIG. 14, is translated into longitudinal sliding movement of the secondary shaft along its axis and within the primary shaft toward the opposite end of the tool.

In the open position the handle lever 28 as in FIGS. 13, 14 and 17, it is extended parallel to the lever body 27 and braced against a brace portion 35 to provide leverage for use of the device. When the handle lever 28 is moved in the opposite direction relative to the tool body from the generally transversely extending position of either of FIGS. 13 or 14 to its closed position shown in FIG. 12 the handle 28 is pivoted about a pivot point 31 to a position parallel to the primary shaft so that the device may be more compact for storage when it is not in use.

The flattened end of the secondary shaft 24 is generally blade shaped and has a forward edge extending transversely of the longitudinal direction of the tool body shaft 21 for engagement with one side of the cable to be tensioned by manipulation of the tool. The flattened end of shaft 24 slides axially or longitudinally relative to and within the flattened end of the tubular primary shaft with its blade tip being moveable over a range of movement therein extending from a point rearwardly of the notch in the primary shaft to a position beyond the tip of the primary shaft as seen in FIGS. 14 and 16. Once the cable is positioned within the notch 25 as shown in FIG. 15, the lever handle is actuated, causing the secondary shaft to move longitudinally forwardly within the primary shaft. The forward movement of the forward edge portion of the shaft 24 toward an opposed side portion of the notch 25 initially grips the cable between these opposed portions of the tool. If the cable is sheathed, the action of the movement within notch 25 of the blade 24 of the tool will generally sever the sheath C2 and cause the cable C1 to be forced into the flattened tubular portion of the primary shaft which extends beyond the notch. This has the effect of both firmly gripping and anchoring the cable and causing a portion of the cable to be taken up within the jaw of the tool. Because of the cable being so anchored, any pulling movement or twisting of the tool body will tend to create a tensive force along the cable, as will retraction of the cable into the jaw of the device by operation of the tool, to effect release of the hood latch. The method of the present invention comprises the Steps sequential of: (1) prying open an appropriate edge portion of the hood and inserting a wedge to keep the hood ajar to facilitate entry of the tool into the engine compartment, (2) determining the location of the hood release cable structure, (3) inserting an elongated release cable grasping tool through the opening near the wedge and initially manipulating the tool to securely engage one of its cable grasping means with the cable structure as by clenching or ensnarling the cable with the cable grasping means of the tool, (4) tensioning the release wire or cable by twisting, pulling or deforming the securely engaged cable by further manipulation of the tool to effect release of the hood latch, and manually opening the hood sufficiently to permit appropriate fire fighting operations in the engine compartment. Using either of the alternate tools described above the tool is inserted through the narrow opening at the edge of the hood. The hood release cable is securely grasped by the cable gripping portion of the device. Once the cable is secured to the end of the device, tension may be applied to the cable by further manipulation of the tool to produce any combination of pulling parallel to the primary axis of the device or twisting the device about its primary axis or by deforming the cable in the manner shown in FIG. 16.

The tools of this invention have cable grasping ends which are permanently secured to the tool bodies. These cable grasping ends have opposed portions which may be positioned transversely relative to a section of cable to be grasped and these opposed portions are of sufficient length greater than the diameter of the cable to engage and remain in contact with opposite sides of the cable section to not only locate the cable grasping end of the tool body relative to the cable section, but also to aid in the grasping of the cable section in response to operation of the manually engageable handle or lever means at the other end of the tool body to apply manual forces through the tool body to gain a firm fastening hold on the cable section to fasten it to the tool's cable grasping end and enable tension forces to be applied to the cable at the fastened cable section for release of the hood latch.

The tools described herein each have manipulable cable grasping means having opposed portions engageable with opposite sides of the hood release cable to securely grasp the cable by clenching or ensnarling the cable.

Figure 4:
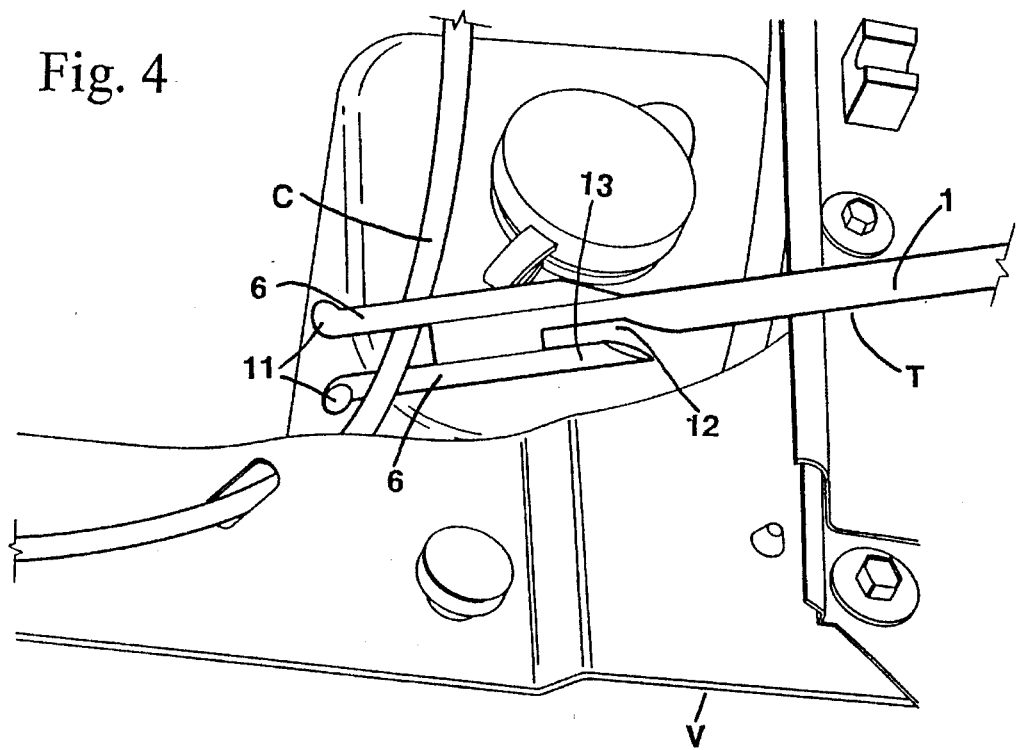
FIG. 4 is a frontal perspective view within the engine compartment of a vehicle showing a primary bifurcated portion of the cable engaging end of the device of the preferred embodiment in its initial engagement with the with the hood release cable assembly.
Figure 6:
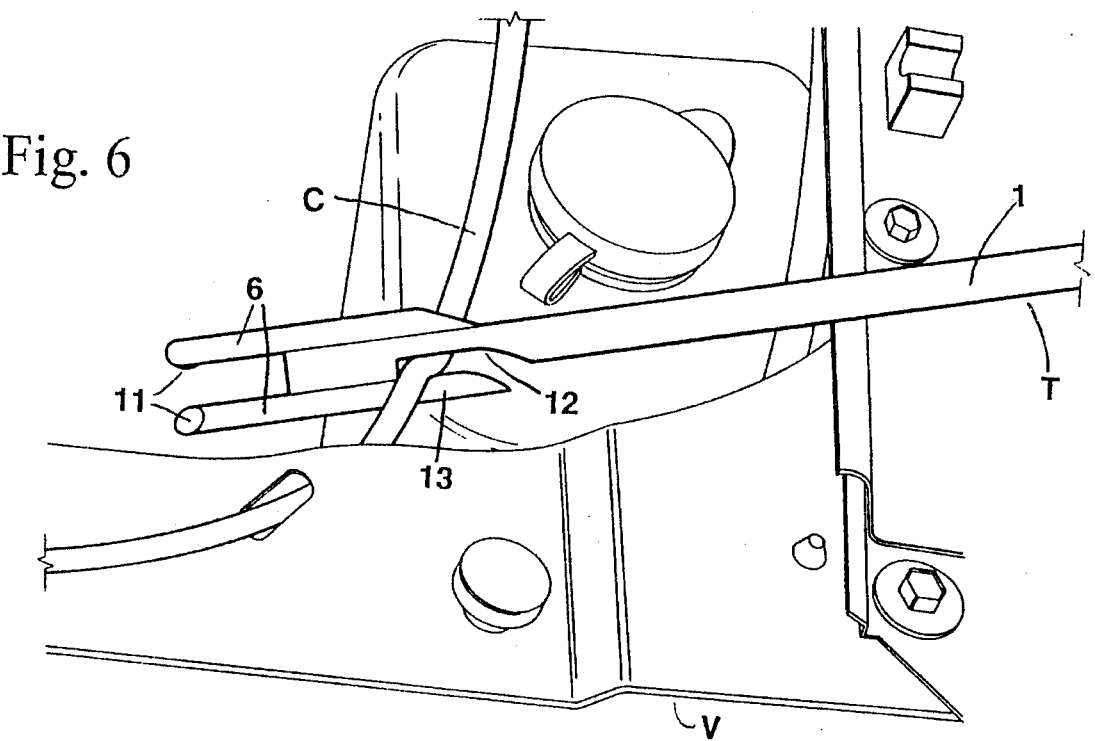
FIG. 6 is a frontal perspective view within the engine compartment of a vehicle showing a hook portion of the cable engaging end of the device of the preferred embodiment in its initial engagement with the with the hood release cable assembly.

In both of the illustrated embodiments of the invention, the cable grasping means at the end of the tool has opposed cable engaging surface portions which are spaced from each other by a distance only slightly greater than the typical diameter of a cable sheath as seen in FIGS. 4, 6 and 16 to initially receive and position the cable relative to the grasping end of the tool. In FIG. 4 these opposed surfaces are the inside axially extending surface portions of the tool extensions 6. In FIG. 6 these opposed surfaces are the inside axially extending surface portions of the rearward tool extensions 13 and the opposing face of the recessed portion of the main shaft. In FIG. 16 the cable is initially located between opposed surfaces formed by the sides of the notch 25, and, upon actuation of the lever handle 28 to effect movement of the edge surface portion of the blade relative to and toward the opposing side surface portion of the notch 25, this edge surface portion of the blade of shaft 24 is forced against one side of the cable and forces the latter against the opposing side surface of the notch 25 to at least initially tightly grip the cable therebetween in preparation for further cable-tensioning manipulation of the tool. All of these opposed surfaces are separated from each other a distance only slightly greater than the diameter of a typical release cable and are within an area relative to the shaft axis corresponding to the typical cross section of the tool body shaft along its length between its first cable grasping end and its second manipulable handle end. Only the diameters of the extensions 6 and the ends of the tips 11 extend radially outwardly with respect to the shaft axis a greater distance than such an area. Accordingly, the maximum transverse dimensions of the cable grasping end of the tools can be kept to a minimum to enter only a narrow or small opening between the hood and the vehicle body or in the vehicle grill.

Both embodiments of the invention have tool head portions which not only lie on opposite sides of the cable for positioning purposes, but also are engaged with opposite side of the cable as it is grasped or ensnarled by manipulation of the tool to enable positive release of the cable by further pulling or twisting of the cable. In FIGS. 4–7 the cable is engaged on opposite sides and ensnarled by initial twisting of the tool. In FIGS. 15-16 opposite sides of the cable are engaged and grasped by the blade portion 24 and the edge of notch 25.

Other variations within the scope of this invention will be apparent from the described embodiment and it is intended that the present descriptions be illustrative of the inventive features encompassed by the appended claims.

What is claimed is:

1. An emergency method of opening a vehicle hood which is secured on a vehicle body in a closed configuration relative to an engine compartment by a releasable hood latch having a means for release which is normally remotely operated by tension applied through a release cable connected thereto, such method comprising:

providing an narrow opening into the engine compartment at an unanchored portion of said vehicle hood by lifting said hood portion away from the vehicle body without permanently deforming said hood; and further comprising:

providing a tool with an elongated body portion with two ends, a first end of said tool being capable of being inserted through said narrow opening;

said first tool end being provided with manipulable grasping means having opposed portions which may be positioned transversely relative to the length of, and on opposite sides of, a section of the cable to be grasped, said opposed portions being of sufficient length greater than the diameter of the cable to engage and remain in contact with opposite sides of said cable section during manipulation of the opposite end of the tool for securely grasping said hood release cable on opposite sides thereof and being manipulable for applying a tensive force to said cable after grasping it to effect release of said hood latch;

said method comprising further sequential steps of inserting said first tool end through said narrow opening, positioning said opposed portions transversely relative to and on opposite sides of said section of cable, manipulating the opposite end of the tool to engage said opposed portions of said first tool end with said hood release cable to provide a firm fastening hold on said cable section with the grasping means of the tool, and manipulating said opposite end of the tool to apply a tensive force to said cable at said cable section to effect release of said hood latch, and thereafter further opening the hood.

2. An emergency hood opening method according to claim 1 wherein said elongated body portion has a longitudinal axis and said grasping means includes hook means for engaging and holding the cable while the tool is twisted about its longitudinal axis, and said manipulation includes a twisting of the tool about said axis to wind a portion of the cable on said tool.

3. An emergency hood opening method according to claim 1 wherein said grasping means includes gripping means having relatively movable opposed portions operable from said opposite end of the tool to anchor said cable to said grasping means.

4. A tool device for opening a vehicle engine-compartment hood secured in a closed configuration by a releasable hood latch having a means for release which is remotely operated by tension applied through a release cable connected thereto, comprising an elongated tool body having a primary axis and with two ends, said tool body being essentially straight along said axis between said ends and of relatively narrow transverse cross section therealong between said ends, a first cable grasping end of said tool body being capable of being inserted lengthwise through a narrow opening providing access to the engine compartment, said first tool body end being provided with manipulable means for engaging and grasping said hood release cable on opposite sides thereof, and means for applying a tensive force to said cable by applying a manual force to said tool body at the outside of the engine compartment after said cable is grasped by said manipulable means for engaging and grasping the cable to effect release of said hood latch, said manipulable means for engaging and grasping said cable having opposed portions which may be positioned transversely relative to the length of a section of the cable to be grasped, said opposed portions being of sufficient length greater than the diameter of the cable to engage and remain in contact with opposite sides of said cable section during manipulation of the opposite end of the tool to locate the cable grasping end of the tool body relative to the cable section and to provide a firm fastening hold on said cable at said cable section to enable said tensive force to be applied to the cable, said opposed portions being separated from each other by a distance only slightly greater than the diameter of the cable and not greater than the maximum dimension of said cross section of the tool body, manually engageable means on the other end of the tool body for applying said manual force through the tool body to apply said tensive force to the cable.

5. A tool device according to claim 4 wherein said manually engageable means includes handle means secured to the opposite end of the tool body for manipulating the device after the device is in engagement with the cable to apply said tensive force to the cable for releasing a hood latch.

6. A tool device according to claim 5 wherein said handle means extends transversely of the tool body for applying a twisting force through said tool body to said means for engaging and grasping the cable to apply a tensive force to the cable by coiling the latter.

7. A tool device according to claim 4 wherein said manually engageable means includes handle means secured to the opposite end of the tool body for manipulating the device after the device is in engagement with the cable to activate said means for engaging and grasping said hood release cable to grasp the cable for releasing a hood latch.

8. A tool device according to claim 7 wherein said handle means extends transversely of the tool body for applying a twisting force through said tool body to said means for engaging and grasping the cable to apply a tensive force to the cable by coiling the latter.

9. A tool device according to claim 7 wherein said handle means extends transversely of the tool body for applying a pulling force through said tool body to said means for engaging and grasping the cable to apply a pulling force transversely relative to the cable to tension the latter.

10. A tool device according to claim 7 wherein said handle means extends transversely of the tool body for applying manual forces on the handle means through said tool device with substantial mechanical advantage to said means for engaging and grasping the cable to apply forces on the cable to take up the cable in a localized area along its length to tension the latter.

11. A tool device according to claim 7 wherein said handle means extends generally transversely of the tool body and is part of a lever means for applying a force from the handle means with substantial mechanical advantage through said tool device to said means for engaging and grasping the cable to apply forces on the cable to take up the cable in a localized area along its length to tension the latter.

12. A tool device according to claim 7 wherein said opposed portions are relatively movable toward each other to grip a section of the cable therebetween and wherein said handle means extends generally transversely of the tool body and is part of a lever means movable relative to the tool body for applying a force from the handle means with substantial mechanical advantage through said tool device to said relatively movable opposed portions of said means for engaging and grasping the cable to apply forces on the cable to tightly grasp the cable at a point along its length to enable further manipulation of the tool device to apply tensive force to the cable to release the hood latch.

13. A tool device according to claim 12 wherein said handle means includes a handle portion extending generally transversely of the tool body during operation of the lever means, said handle portion being movable in one direction relative to the tool body to actuate said relatively movable opposed portions of the means for engaging and grasping the cable to grasp the cable and being foldable in an opposite direction relative to said tool body to a position adjacent and parallel to the tool body for storage of the tool device.

14. A tool device for opening a vehicle engine-compartment hood secured in a closed configuration by a releasable hood latch having a means for release which is remotely operated by tension applied through a release cable connected thereto, comprising an elongated tool body with two ends, a forward end of said tool body being capable of being inserted lengthwise through a narrow opening, said forward tool body end being provided with means for engaging and grasping said hood release cable and applying a tensive force to said cable to effect release of said hood latch, said engaging and grasping means comprising a bifurcated structure having two extensions permanently secured to said tool body and forming extensions of the tool body with parallel inner walls extending beyond the forward end of the tool body for straddling a portion of a cable therebetween and wrapping the cable around said extensions by twisting the tool body to apply a tension force to the cable to release the hood latch, said forward end of the tool body having a maximum transverse cross-sectional dimension which is determined by said two extensions whereby said tool can enter such a narrow opening of minimum size to avoid damage to the vehicle in creating the opening, manually engageable means on the other end of the tool body for applying a force through the tool body to apply said tensive force to the cable.

15. A tool device according to claim 14 wherein each extension is an L-shaped member, said L-shaped members having parallel main legs with a minor at the end of each said main leg, said minor legs having free ends extending in opposite directions to aid in retaining wrapped cable on said extensions when the tool body is twisted.

16. A tool device according to claim 15 wherein the free ends of said minor legs are beveled to facilitate sliding them under a cable located against a flat surface extending generally perpendicular to said elongated tool body.

17. A tool device according to claim 15 wherein the free ends of said minor legs are beveled to facilitate sliding either of them under a cable located against a flat surface extending generally parallel to said elongated tool body.

18. A tool device according to claim 14 wherein said engaging and grasping means further comprises a rearwardly open elongated crook at a side of said forward end of the tool body for hooking around a portion of a cable.

19. A tool device according to claim 18 wherein said elongated crook is formed at least in part by an elongated recess in the tool body.

20. A tool device according to claim 19 wherein said elongated crook is formed by a rearwardly extending portion of one of said main legs overlying a portion of said elongated recess.

21. A tool device according to claim 14 wherein said engaging and grasping means comprises a rearwardly open elongated crook at a side of said forward end of the tool body for hooking around a portion of a cable and a handle extending transversely relative to the tool body at its other end to manipulate the elongated crook within the engine compartment.

22. A tool device according to claim 14 wherein said extensions include abutment means engageable with cable wrapped on said extensions to aid in retaining the cable on said extensions during twisting of the tool body.

23. A tool device according to claim 14 wherein said extensions include surface portions extending transversely relative to said extensions to engage portions of the wrapped cable on said extensions to prevent the wrapped cable from slipping lengthwise of the tool on the extensions.

* * * * *